Jan. 25, 1955     G. H. FERNALD     2,700,694
POROUS SEPARATOR AND METHOD OF MAKING IT
Filed Sept. 7, 1951     2 Sheets-Sheet 2
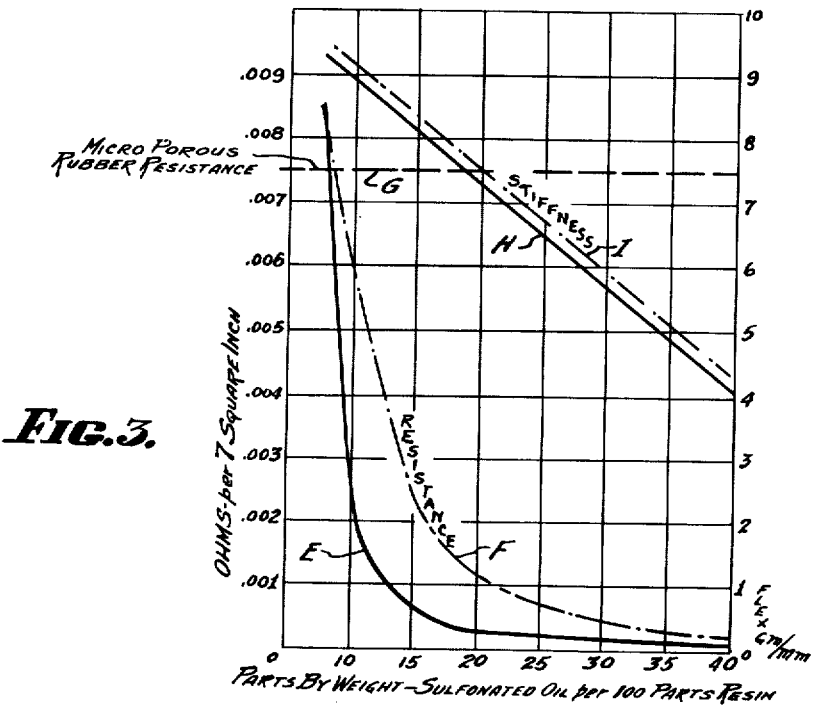
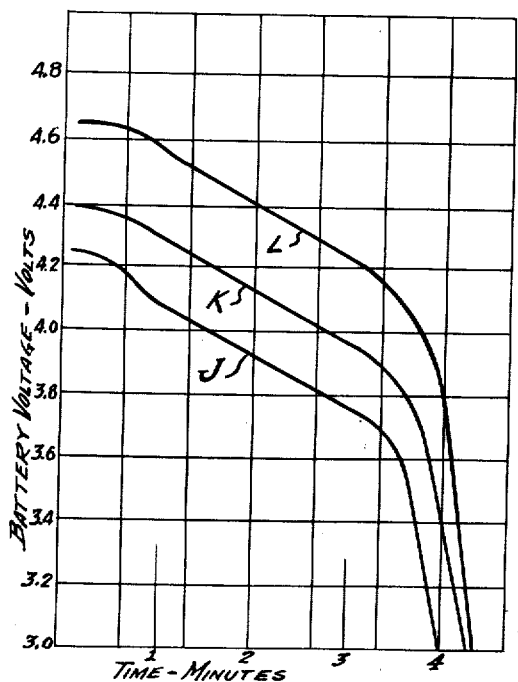
INVENTOR.
GORDON H. FERNALD,
BY
ATTORNEYS.

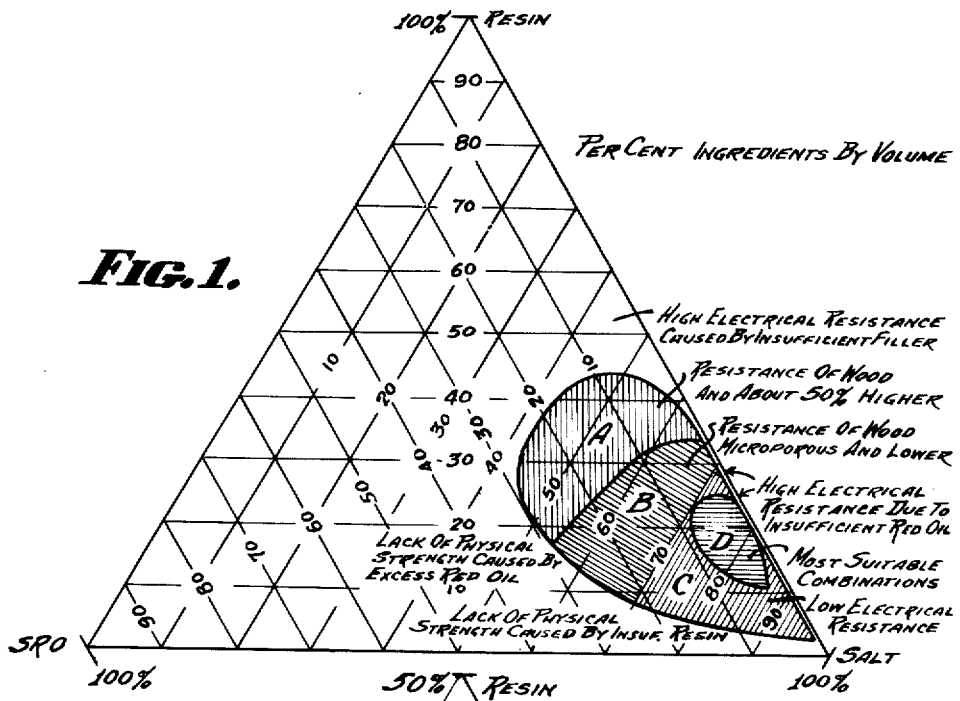
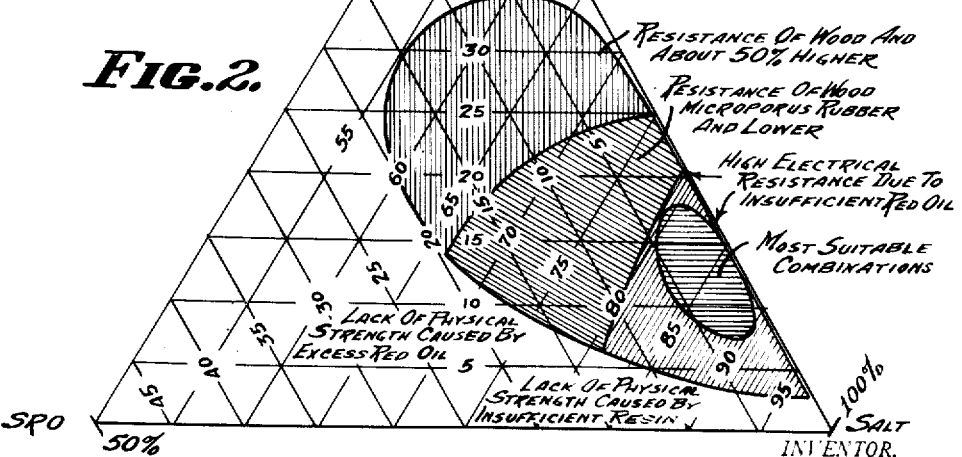

United States Patent Office 2,700,694
Patented Jan. 25, 1955

2,700,694

POROUS SEPARATOR AND METHOD OF MAKING IT

Gordon H. Fernald, Geneva, Ill., assignor to The Richardson Company, Cincinnati, Ohio, a corporation of Ohio Application September 7, 1951, Serial No. 245,477

17 Claims. (Cl. 136—146)

My invention relates to the formation of porous separators for use in electrical accumulators, particularly of the lead-acid type, and to that class of separator wherein an acid-resistant body is rendered porous by the incorporation of a finely divided removable substance in the matrix from which the body is made, this substance being subsequently removed, as by leaching. For many years there has been intensive work done in an endeavor to produce separators of this general type, and separators have been produced which were successful in that they had an electrical resistance in use approaching that of wood.

The provision of satisfactory separators for electrical accumulators presents increasing problems both by reason of the progressive scarcity of wood suitable for the formation of separators and by reason of changes in the storage battery art itself. For example, the wood separator which hitherto has been regarded as satisfactory must be stored and used in a wet condition since if it is permitted to dry out, it is subject to warpage and splitting. As a consequence, wood is not satisfactory for use in making the so-called "dry" charged or uncharged storage batteries. Another type of separator which is widely used is the so-called microporous rubber separator which has a performance equal to and for the most part superior to wood but is expensive.

The attempts which have hitherto been made to manufacture separators in the form of a self-sustaining resinous body have employed removable porosity-imparting fillers of three general types. It has been suggested to incorporate a filler which can be caused to release a gas concurrently with or prior to the removal of the filler, the thought being that the separator will be puffed or expanded by the gas so that a sufficient porosity can be achieved with a minimum of filler substance. It has also been suggested that the filler be a material such as starch which can be converted and physically expanded as an incident to its removal whereby to increase the porosity resulting from the incorporation of a given amount of the dry filler. Inherent disadvantages of these procedures lies not only in their relatively high cost but also in the difficulty they present of maintaining the dimensions of the product within acceptable close tolerances. The third procedure contemplates the use of a filler which may be removed by leaching but neither gives off a gas nor undergoes a physical expansion as a result of the leaching treatment. Here the degree of porosity is theoretically dependent upon the amount of the finely divided leachable solid originally incorporated in the matrix. In the practice of my invention I prefer to employ leachable solids of the last mentioned class, although it is within the scope of my invention to apply the teachings hereinafter to fillers which either swell or give off a gas, or both.

A primary object of my invention is the provision of a mode of making separators consisting ultimately of a self-sustaining body of binder in a porous condition where the porosity is the result of the removal of a removable agent initially incorporated in the matrix, and the solution of a number of problems arising from such procedures, all as will be set forth hereinafter.

It is, however, an exceedingly important object of this invention to produce separators having new and improved characteristics as compared with any separators heretofore known, as will also be more fully set forth.

Finally, it is a main object of my invention to produce separators which combine desirable porosity and low electrical resistance with desirable physical characteristics.

These and other objects of my invention, which will be set forth hereinafter or will be apparent to one skilled in the art from reading these specifications, I accomplish in those procedures and in those separators of which I shall now describe certain exemplary embodiments. Reference is made to the drawings which form a part hereof and in which:

Fig. 1 is a triangular diagram in which contents of binder, leachable substance and control agent are plotted against each other in percentages by volume.

Fig. 2 is a triangular diagram in which these ingredients are plotted against each other in percentages by weight.

Fig. 3 is a chart in which separator resistance is plotted against the content of control agent used in the initial mix.

Fig. 4 is a chart showing the performance of various separators on the 300 ampere discharge test.

The need for porous separators in electrical accumulators has, of course, long been recognized. A lead-acid accumulator built without separators but with positive and negative plates separated a slight distance from each other in the electrolyte would operate at very high efficiency for a brief period; but it would soon become useless not only because the plates might buckle and make contact with each other, but also because of the accumulation of chemical substances which would bridge across between the plates. As a consequence, the plates must be assembled with separators between them. These separators must be porous to facilitate ionic transfer in the electrolyte between the plates, and they must have sufficient porosity as respects this ionic transfer to present a relatively low electrical resistance within the cell. At the same time, the passageways within the separator must be sufficiently fine so that the chemical substance aforementioned cannot tree across from plate to plate within the passageways of the separator. The exact mechanism of ionic transfer is not fully understood, nor is it possible to define the desirable porosity in ordinary terms such as the ability of a separator to pass a given quantity of liquid or gas at a given pressure within a given time.

As indicated above, the separators to which this invention is directed have in their final form a body of self-sustaining, suitable porous binder. The porosity is achieved by the initial incorporation into the binder of a removable substance. In the formation of such separators a plastic mix is produced which is then formed into sheets, preferably though not necessarily, by extrusion. The sheets are then treated for the removal of the removable porosity-imparting substance, and the separators are then ready for use.

In order to permit the incorporation of a sufficient quantity of the removable substance in the initial matrix or plastic mass, the binder will be extended through the use of a volatile solvent. This solvent will be removed after the formation of the sheet stock, and its removal will contribute to the ultimate porosity. There are, however, limits to the use of a solvent as hereinafter set forth.

As respects the initial plastic mix, there are four essential ingredients in accordance with my invention: ($a$) a suitable binder which will form the body of the completed separator, ($b$) a solvent used in the proper proportions which will in part at least extend the binder during the incorporation of the removable porosity-imparting substance therein, ($c$) a finely divided removable porosity-imparting substance ordinarily employed in large quantity as respects the other ingredients, and ($d$) a control agent in the nature of a surface-active substance which must be incorporated in the initial mix.

The incorporation of the control agent in the initial mix is new with me and is being claimed broadly in this application. Surface-active agents are wetting agents for the most part; and it has hitherto been suggested that finished storage battery separators be treated with such wetting agents especially where they are to be handled, stored and shipped in a dry condition. The deposition of a small quantity of wetting agent in a finished separator, i. e. by soaking the separator in a solution of the wetting agent and then drying, will facilitate the re-wetting of the separator by storage battery electrolyte; but this should not be confused with the effects obtained in the present invention where a ready re-wetting is incidental merely. The other effects obtained by me in the use of a surface-active agent as hereinafter taught cannot be obtained by merely treating a finished separator with a wetting agent.

I shall now describe in general the requirements for the four essential ingredients of the initial mix or plastic mass.

The binder

The binders which I prefer to use are resinous in nature. They must have sufficient strength to form self-sustaining, handleable bodies in thin sheet form when in the porous condition required for purposes of this invention. The resin may be a thermoplastic resin, or it may be a mixture of thermoplastic and thermosetting resin. The cellulosic thermoplastic resins have not been found by me suitable for the manufacture of storage battery separators by reason of chemical action of the electrolyte thereon. All types of vinyl resins and vinyl copolymers are suitable, however. Polyethylene is a suitable resinous substance, although it has, when used alone, an undesirable limpness and flexibility. As a consequence, I prefer to employ it when modified and made firmer through the incorporation of various waxes, asphalts and the like, or when in admixture with methyl or other methacrylates or with styrene resins or mixtures of these substances. The methyl and other methacrylates and the styrene resins are satisfactorily acid resistant, but when used alone, they tend to be too brittle and, therefore, they should be modified with other substances such as waxes, asphalts, less hard thermoplastic resins, such as vinyls, or with polyethylene. Nylon and other similar proteinaceous resins may be employed.

The thermoplastic resins may be used alone or in admixture with acid-resistant thermosetting resins such as phenol-formaldehyde resins (inclusive of the cresylic and xylenic resins and mixtures thereof), phenol-fural resins and the like. It is necessary that the thermoplastic and thermosetting resins be compatible with each other where used together. A percentage of thermosetting resin is of advantage in preserving the dimensional stability of separators containing thermoplastic resins of relatively low molecular weights. It has been found, however, that sufficient dimensional stability can be attained with thermoplastic resins alone if these are initially of high enough molecular weights. Separators formed entirely of thermosetting resins have, in my experience, been somewhat deficient in the matter of electrical resistance. The lowest electrical resistance may be obtained from a binder which contains as much as about one part of thermosetting resin by weight to two parts of thermoplastic resin. Higher resistances, but still equal to that of microporous rubber, can be obtained with as much as a ratio of thermosetting to thermoplastic resin of 1:1. A still higher resistance, but equal to that of the standard wood separators, can be attained with as much as 60 parts of thermosetting resin to 40 parts of thermoplastic resin.

As will be evident from the above, I am not limited to binders consisting of thermoplastic or thermosetting resins or mixtures of the two, since other substances may also be present. Among these substances I mention natural and artificial rubbers, mixtures of rubber and other substances such as styrene resin or wax, or both, and those rubber-like copolymers such as neoprene, etc.

Within the framework of what has been said above, the specific nature of the binder is not a limitation on the invention. The term "binder" is used as a term covering the main substance of the finished separator as set forth in this section, although as will later appear, the finished separator consists essentially of such substance plus preferably a residuum of the control agent; the solvent and the porosity-imparting substance will have been substantially entirely removed.

The solvent

As set forth above, the purpose of the solvent is to extend the binder for the purpose of softening it for mixing where that is required and permitting it to contain a relatively large quantity of the porosity-imparting substance while the binder remains in the continuous phase. A solvent should be selected which will extend the resin at forming temperatures and which will boil at some temperature above the compounding temperature but below the decomposition temperature of the initial mixture or any component thereof, and which at the same time will be a non-solvent for the porosity-imparting ingredient usually called the filler. It may be pointed out that the solvent must be one capable of extending the combination of the binder and the control agent, as hereinafter described, i. e. it should not cause a separation of the binder and the control agent.

The nature of the resin will control the nature of the solvent; and any skilled worker in the art, having selected a suitable binder or binder mixture, can determine the choice of solvents from any standard work listing solvents for such binder or the components thereof. For example, when using vinyl or vinyl copolymer resins, common solvents listed in such works are the esters, various nitrogenated and chlorinated solvents and the ketones. The skilled worker may discard certain solvents because of special properties, and in the example above, may prefer not to employ the nitrogenated and chlorinated substances because of their toxicity. Similarly, with polyethylene alone or in admixture with waxes and the like, benzene and toluene are suitable solvents. Benzene likewise is a suitable solvent for styrene resins, while the higher ketones may be employed with methacrylate and styrene resins or mixtures of the two.

The selection of a solvent for the binder thus presents no essential difficulties. Preferred solvents are in all instances those which bring about a gelatinous condition of the binder within the range of permissible solvent quantity. The range is essentially limited. With too little solvent, the binder may not be extended far enough to contain the filler and remain in the continuous phase. On the other hand, too much solvent will prevent the mix from holding together properly during and after formation. The precise quantity of solvent may be governed in some degree by the conditions of processing. For example, in the procedure which I prefer to use, the powdered binder, the finely divided filler, the control agent and the solvent are mixed together in a suitable dispersing type mixer to form a powdery substance which is "dry" and non-sticky in spite of the presence of the solvent. This powder is subsequently worked in an extrusion mixer of a type in which substantial internal pressure can be built up. Since for the proper homogenizing of the mix considerable mechanical work is required, it will be found that if there is too much solvent present and the material is too soft, it will be difficult to perform the necessary amount of mechanical work on the mix in order to distribute the filler uniformly.

For all of these reasons, the amount of solvent employed should preferably be in volume about 1.3 times the volume of the binder alone for volumes of filler below 86%. In general, the volume of the solvent may vary roughly from about 1.2 to 1.4 times the volume of the binder until very high loadings of salt are reached (over 85% filler). When the salt or other filler exceeds about 85% by volume, it may be found desirable or necessary to increase the amount of solvent in order to attain the desired working viscosity of the mix; but of course there is under these circumstances a loss in processing toughness of the mix.

The solvent will, of course, be driven out of the final product by evaporation after the sheeting of the mix, and it will be seen from what has been said above that the quantity of solvent is to all intents and purposes a constant. Thus, in the discussion of mix proportions and of the charts which accompany this specification, consideration of the solvent as such has been eliminated.

The filler

A wide choice of porosity-imparting or filler substances is possible including substances, as set forth above, which undergo some chemical change during the process of removal. The filler substance should be inert as respects the other components of the mix, i. e. the binder and its components, the solvent and the control agent. It should preferably be a substance readily removable from the sheeted composition. My preference is for simple substances which may be leached from the separator stock by a treatment in hot water, and in particular, for substances having such properties and also being readily removable. A water insoluble filler may be removed by an appropriate liquid leaching agent or solution, but it will be evident that in general this would increase the cost. My preference is for such substances as sugar, pulverized urea crystals, or various forms of inorganic salts which have a high solubility rate in water and meet the other qualifications set forth above. In most instances I have found ordinary sodium chloride, hereinafter referred to as salt, to be entirely satisfactory. It has a ready solubility in water, can easily be ground to the required fineness, and can relatively cheaply be recovered for reuse.

There is an importance in the particle size of the filler substance both as respects its extractability and in the resulting quality of the porosity of the final separator. I prefer in all instances to use a filler in such finely divided condition that all of it will pass through a standard 200-mesh sieve. By way of example, with a standard formulation where the extraction time was 27 minutes at 145° F. in flowing water, with salt all of which would pass through a 200-mesh screen, the average particle size being about 50 microns, the extraction time was reduced to 20 minutes where the average particle size was reduced to 8 microns, and to 18 minutes where the average particle size was reduced to 5 microns. In general also, the resistance of my separators goes down as the particle size is reduced. As indicated, any filler should have a screen grading of 200 mesh or finer, and my preference is for the use of fillers having an average particle size of about 5 to 8 microns or less. In practice I prefer to subject the salt or other filler to mechanical grinding to reduce its particle size to an average of around 5 to 7 microns, or the filler may be subjected to the action of a fluid energy reduction mill wherein the particle size is reduced, preferably to the extent of lowering the sizes of the greater number of the particles to 2 microns or less.

The control agent

An essential feature of my invention is the use in the initial mix of a surface-active agent as hereinafter set forth. I have discovered that such use can have the following four advantages if the control agent is properly chosen:

(1) Surprisingly, the final separator has a very much lowered resistance to the passage of current through ionic conduction for equivalent physical properties and thickness, in operation in an electric accumulator. Why this should be so, is not understood.

(2) In the process of producing separators, the control agent may exert a toughening action on the solvent-extended resin, increases the strength of the gel, and for equivalent characteristics of the plastic mix, permits the incorporation of somewhat greater amounts of filler. Of more importance, however, is the fact that for equivalent amounts of filler, the properties of the mix are superior.

(3) The control agent may exert a plasticizing action on the binder in the final separator, making for a less brittle and stronger end product, i. e. it improves the physical characteristics of the separator itself.

(4) A small percentage of the control agent remaining in free form in the final separator makes the separator rewettable by water and water solutions including the electrolyte, so that the separators may be handled, stored and shipped in a dry form.

Of these advantages, the first is of fundamental importance in this invention.

It is not attempted above to summarize all of the advantages which flow from the use of the control agent. Of the advantages which have been set forth, only the last mentioned advantage—namely the re-wettability—could be secured by treating a finished separator with a surface-active agent. The extremely low resistances hereinafter more fully discussed and the other named advantages will not be secured in any degree unless a suitable control agent is incorporated in the initial mix.

The control agents which I employ are surface-active agents such as those generally classifiable in the art as anionic or non-ionic surface-active agents. The control agent employed by me, since it must be used in the initial mix, must be compatible or miscible with the resin or other binder employed and with such binder in the presence of the solvent. I am not representing that all non-ionic and anionic surface-active agents are the full equivalents of each other since many of them have special properties which are either advantageous or disadvantageous, depending upon the circumstances. I have discarded the use of most of the cationic emulsifiers or surface-active agents in my work with separators because in general they have a tendency to produce a skin effect in high ionic concentration in the extractor water which is undesirable. Some anionic surface-active agents have a tendency to impair the cohesion of the mix. In general I may employ sulfated or sulfonated products derived from mineral, vegetable and animal oils including marine oils. Not all of the non-ionics are the full equivalents of each other. For example, some non-ionics, such as those from peanut oils, impart improved strength characteristics to the final product but do not improve extraction time. Others like those based on sperm oil decrease the extraction time but do not improve physical properties materially.

The nature of the binder has an effect on the choice of control agent. For example, with a binder consisting of or comprising polyethylene, a polyethylene-glycol type of surface-active agent may be employed with advantage. With rubber or binders containing substantial quantities of rubber, surface-active agents containing amino and sulfonic groupings may be employed, but it will be advisable to use a non-salt filler under such circumstances. With nylon as a binder and, say, sugar as a filler, any commercial surface active agent of which I am aware may be employed. It is characteristic of anionic and non-ionic surface-active agents compatible with the chosen binder and solvent and inert to the filler, that while they may act in various ways as extenders, plasticizers and the like, they do remarkably and surprisingly decrease the resistance of the separator when used as an ingredient of the initial mix.

Of all of the wetting agents which I have employed, I prefer to use a commercial material known as "sulfonated red oil." Actually, this material is a sulfated oleic acid. It is a plasticizer for thermoplastic resins, effects a very substantial decrease in extraction time, and improves the physical properties of the final separator, there being more rigidity with less brittleness. It effects the greatest improvement in resistance of the separators.

It is within the scope of my invention to employ one or more surface-active agents alone or in combination and with or without other materials such as oils and the like which have a plasticizing or extending action. For example, in some formulae I use a small proportion of an aromatic petroleum extract such as Dutrex–20, for example, about .3 to .5 lb. of the extract for each 3 lbs. of resin in the product.

The exact quantity of surface-active agent is capable of wide variation, and the skilled worker in the art can vary the content thereof to obtain various conditions during mixing. A large quantity of the control agent will be removed from the separator during the leaching process. The leaching process can frequently be controlled, as hereinafter set forth, to determine the final amount of free surface-active agent in the separator. Some of it doubtless combines with the binder to form a permanent or substantially permanent plasticizer. The amounts of surface-active agent in the mix may vary from very minute quantities to very substantial proportions such, for example, as up to 30 parts or more of the surface-active agent to each 100 parts of the resin or other binder substance.

Proportions

Within the framework of the desired qualities of the essential ingredients, as set forth above, the characteristics of the final separator will change with the proportions of three essential ingredients, namely, the binder, the filler, and the control agent, and since proportion-wise, both by volume and by weight, these must necessarily vary in relation to each other, it is possible to chart my discovery on triangular diagrams as, for example, in Figs. 1 and 2. These diagrams pertain to a particular binder of thermoplastic character which is a vinyl chloride-vinyl acetate copolymer, to a control agent which is the sulfonated red oil, and to a filler which is sodium chloride, although these diagrams will serve as a substantial guide for other binders, fillers and control agents. In Fig. 1 the corners of the diagram are respectively marked resin, salt and SRO, indicating sulfonated red oil. The apices of the diagram in Figure 1 represent 100% of the substance marked at the apex, while the side opposite each apex represents 0% of the same substance. Fig. 1 pertains to volumetric proportions, but this is important because various fillers differ in specific gravities, whereas it is the volumes of the filler substances which directly affect porosity, as will readily be understood.

The shaded areas on Fig. 1, taken together, represent combinations of proportions which I have found produce satisfactory storage battery separators. The area of the diagram lying above the combined shaded areas in the figure represents, in accordance with its legend, relatively high resistances in the separators due to the use of relatively small quantities of filler in the initial mix. To the left of the combined shaded areas is an area which, in accordance with its legend, represents separators which have been too greatly plasticized by excessive quantities of red oil to have sufficient physical rigidity for ordinary use. Below the combined shaded areas there is a region containing separators lacking in physical strength because of an insufficiency of binder, or in other words, too great a percentage of voids.

The shaded area is also divided into various subareas demarked by different kinds of shading. The topmost shaded subarea A is an area of proportions in which separators are obtained satisfactory in physical properties and ranging generally in use from a resistance around that of wood separators to a resistance about 50% higher. This limit is a more or less arbitrary one, but assuming the continued availability of wood, reasonably marks a limit of high resistance for commercial purposes. The area B is an area in which the separators can be made having resistances comparable to that of microporous rubber. The whole area C is an area of separators having very substantially lower resistances than microporous rubber, while the area D includes those separators which I have found to be the best producible. I shall presently explain the significance of the resistances mentioned.

It will be noted that the aggregate shaded area includes roughly compositions in which by volume the amount of control agent extends from a very low quantity up to about 30%, compositions in which the salt content extends roughly from about 96% down to about 42%, again by volume, and in which the resin content extends roughly from about 3% to about 44%. Along the extreme right-hand edge of the diagram, where the quantity of control agent by volume is substantially less than 1%, there is an exceedingly narrow area of high resistance separators indicative of too little control agent in the initial composition to affect porosity, and hence resistance, favorably. It will be noted also that if the amount of control agent is held constant, electrical resistance will vary in proportion to the salt content and inversely to the resin content of the mix.

Fig. 2 is a graph for the same ingredients based on percentages by weight. In this chart the apices represent 100% of the ingredients but the straight lines opposite the apices represent 50% of the ingredients. This results in a chart covering a smaller area and hence having a larger shaded area proportionately; but it will be noted that the areas follow the same pattern generally. They have been marked with the same legends and the same index numerals.

Referring to the chart, Fig. 3, which is a two-dimensional chart, in which resistances are plotted on the ordinate and parts by weight of the sulfonated red oil on the abscissa, curves E and F represent two different processing conditions. It will be noted that these curves show a relatively sharp break, at relatively low contents of the control agent. A horizontal line G represents the resistance of conventional microporous rubber separators, and it will be seen that the addition to the mix of relatively very small quantities of the control agent is sufficient to produce a tremendous lowering of the resistance over that of the best conventional separators heretofore known. Another pair of curves H and I have been added to the chart, and are related to the same abscissa, but to the right-hand ordinate with values indicative of flexure under a given load. It will be seen that as the quantity of control agent is increased, the stiffness is reduced substantially linearly. It will also be evident from this chart that optimum resistances are obtained with comparatively very small quantities of the control agent and that a substantial further increase in the quantity of control agent does not greatly lower resistance but does lower stiffness. The stiffness and similar properties of a storage battery separator can be varied if desired in accordance with the locality in which the separator is to be used and, in particular, with the weather conditions and temperatures to be expected.

Thus, storage battery separators can be considered operative and commercial over a very wide range of stiffnesses; but it is readily possible, as will be evident, to obtain separators in accordance with my teachings combining extraordinarily low resistances with reasonably high stiffnesses.

Attention is now drawn to the chart, Fig. 4, which shows the results of the performance of storage batteries having separators of different substances on the so-called 300 ampere discharge test at 0° F. The particular chart is the chart for the sixth cycle of such tests on particular test batteries. Time on the abscissa is plotted against voltage on the ordinate. The curve marked J is a curve for a battery having conventional wood separators. It will be noted that the initial voltage lay between 4.2 and 4.3, the curve falling rapidly thereafter until, at around 3½ minutes of elapsed time, it turns sharply downward. The curve K is a curve for a battery having microporous rubber separators. It will be seen that the curve starts at a 4.4 voltage and roughly parallels the curve for the battery having wood separators. Nevertheless, it will be seen that if the horizontal line representing a voltage of 4.2 is taken more or less arbitrarily as a reference line, the battery containing wood separators was able to deliver that voltage for only about ½ minute, whereas the battery having the microporous rubber separators was able to deliver that voltage for approximately 1⅔ minutes. The curve L is a curve for a battery on the same test having separators of my invention made within area D of Figs. 1 and 2. It will be noted that this curve starts at a voltage between 4.6 and 4.7 and roughly parallels the other two curves. Taking the same reference line, namely that representing a voltage of 4.2, it will be observed that the battery having my separators maintained a voltage in excess of that figure for well over 3 minutes.

As a matter of fact, the resistances of the separators made by me within the areas C and D of the charts, Figs. 1 and 2, are so extremely low that the performance of batteries equipped with my separators on such tests as that illustrated in Figure 4 is substantially the same as would be achieved in a battery without any separators at all. The particular test shown is one made under conditions outlined above on 100 ampere hour batteries. It will be understood that the particular values shown on the chart will vary with the capacity of batteries tested and the circumstances of any individual testing; but the comparison shown is typical of the performance of equivalent batteries differing from each other as to the types of separators employed under all high amperage discharge tests.

*Processing*

Considering the areas shaded on the charts of Figs. 1 and 2, it will be evident that the proportions of ingredients can be widely varied. Keeping in mind that the quantity of solvent within fairly narrow limits will bear a substantially constant relationship to the quantity of binder substance, the charts will serve as a guide for proportions of ingredients in the initial mixes, and this is especially true of the volumetric chart, Fig. 1, irrespective of specific variations in the ingredients themselves. As applied to the filler, the volume is that of the filler substance itself, irrespective of the fineness of its state of subdivision.

As a consequence, two formulae only are here given for purposes of illustration, it being understood that these are in no sense limiting.

A formula which has given excellent results in the manufacture of storage battery separators with an all-thermoplastic binder is as follows:

|  | Parts by weight |
|---|---|
| Thermoplastic resin (preferably polyvinyl chloride or the acetate copolymer, and having a molecular weight of 25,000 or higher) | 100 |
| Salt | 1000 |
| Dutrex-20 | 12–20 |
| Solvent (di-isobutyl-ketone or other suitable solvent) | 100 |
| "Sulfonated red oil" | 30 |

A typical formula for a separator in which the binder is a combination of thermoplastic and thermosetting resins is as follows:

| | Parts |
|---|---|
| Thermoplastic resin (such as vinyl chloride-acetate copolymer) | 150 |
| Phenol-furfural resin | 50 |
| "Sulfonated red oil" | 50 |
| Solvent (e. g. Cellosolve acetate) | 150 |
| Salt | 1700 |

From either of these formulae there can be made storage battery separators of the extremely low resistances characteristic of the areas D of the charts of Figs. 1 and 2 with sufficient physical strength, stiffness and dimensional stability to meet all of the requirements of the use of storage battery separators in any climatic conditions encountered in the continental United States.

The manufacturing procedure which I prefer to use is to commingle all of the ingredients (the binder being in powdered form) in an ordinary mixer or preferably an attrition mill, such as the Sprout-Waldron mill, a cone blender or a Muller mixer. The mixed product is a powdery mass having a "dry" appearance and feel because the quantities of liquid ingredients present are not sufficient to cause it to agglomerate at room temperatures.

The dry powder mix is next transferred to a compounder-extruder in which the material may be subjected to heat and mechanical working and preferably to considerable pressure in an enclosed system in which the solvent is fully retained. A good example of the latter type of mechanism is that manufactured by Welding Engineers Inc. and fully described in an article in the magazine "Modern Plastics" for June 1949. The effect of pressure working in a closed system may be obtained in an extrusion machine which has a propelling worm followed by a reverse worm, or by restrictions so as to set up a back pressure and an intense masticating action without releasing the volatile constituents from the material.

In the compounder-extruder the dry mix is both plasticized and homogenized and after sufficient working, is extruded from the device through a suitably shaped die or orifice. The ultimate thickness and cross-sectional shape of the continuous strip of sheeted stock is determined by the orifice of the die which may be notched to produce the desired ribs. The continuous strip as so formed is next carried by a conveyor through a zone in which it is subjected to sufficient heat to drive out the solvent and to polymerize any thermosetting resin which may be present.

Next, the stock is subjected to a leaching step preferably accomplished in a continuous manner by passing the stock through an elongated trough or tank, hot water (where the filler is water soluble) being passed through the trough in countercurrent to the stock. In actual practice the water as introduced into the trough is at a temperature of substantially 170° to 180° F., its temperature falling to about 120° F. at the outlet. The leaching time may be of the order of 20 to 25 minutes or less. When the filler is salt, I prefer to extract or leach until less than 1% (usually about 2 milligrams per square inch) remains. Such a residual salt content is tolerable in a separator and will be decomposed when the plates of the battery in which the separator is used are "formed."

A percentage of free surface-active agent preferably is retained in the separators so that after drying they can readily be re-wet by the electrolyte. An advantage of the "sulfonated red oil" as well as of many other surface-active agents is that while they will not salt out under the manufacturing conditions obtaining in my process, their solubility is depressed by salt dissolved in the leaching bath. Consequently, it becomes possible to control the quantity of surface-active agent remaining in the separators by control of the concentration of the leaching solution and thus insure a retention of sufficient free surface-active agent to serve the wetting purpose substantially irrespective of the completeness of removal of the salt. I have not been able to determine the precise quantity of surface-active agent which must be retained in a separator to provide ready re-wettability; but the quantity is very small. I have encountered no difficulty in retaining a sufficient quantity, although it is not beyond the scope of my invention to remove wetting agent until free rewetting is impaired and then treat the separator in a water solution of additional wetting agent before drying. Actually, ready re-wettability is not necessary to the functioning of my separators.

Where in this application I have referred to the resistances of separators, I mean primarily their resistances under conditions of actual use in an electric accumulator. In the laboratory resistances are frequently measured by determining the conductivity of an electrolytic bath and then dividing the bath by a separator acting as a diaphragm and in this way ascertaining the resistance interposed by the separator to the flow of the electric current by difference. Such tests, practiced upon separators which have been dried are likely to give misleading results because, if the separators have not been throughly permeated by the electrolyte at the time of the test, the test result is no more than an indication of wettability, and as such is quite likely to be affected by the amount of free wetting agent remaining in the separators. To give a true indication of resistance, the separators must be tested when completely permeated by the liquid. This may be accomplished by testing the separators after manufacture but before they have been dried. It may also be accomplished by carefully soaking or rewetting dried separators, in which case the time and temperature of soaking may be affected by the presence of wetting agent.

But I have found that operation of an electric accumulator, i. e. initial charging or cycling has the effect of driving the electrolyte through my separators irrespective of the quantity of wetting agent which is present in them. Putting this another way, the presence of residual free wetting agent in my separators has not been found by me measurably to affect their ultimate resistance when thoroughly wet, and has not been found to be necessary to the securing of complete wetting by the electrolyte under conditions of use in an accumulator.

Where a relatively large quantity of wetting agent is desired to be retained in the separator, as for example, for the purposes set forth in the copending application of Gordon H. Fernald and Gordon B. Lucas, Serial No. 201,492, filed December 18, 1950, entitled Protected Storage Battery Plate, Assembly, and Process, it may readily be provided as set forth above.

When the separator stock has been formed as described and dried, it is then cut into finished storage battery separators which are then used as such or packed for storage and shipment.

This application is related to certain copending cases wherein the use of surface-active agents as an ingredient of the initial mix has been disclosed as follows:

The application of Edward R. Dillehay (deceased) and myself, Serial No. 43,767, filed August 11, 1948, entitled Storage Battery Separator and Method of Making It, wherein there is claimed the use of a combination of thermoplastic resin and thermosetting resin in the binder for the purpose of avoiding shrinkage and dimensional change.

My copending application Serial No. 110,669, filed August 16, 1949, and entitled Separator for Electric Accumulators and Method of Making It, in which there is taught and claimed some special procedures facilitating the making of separators from binders of rubber and rubber-like substances.

The copending application of myself and Kenneth M. Enloe, Serial No. 224,844, filed May 5, 1951, and entitled Porous Body and Method, in which the teachings and claims relate to the selection of thermoplastic resinous binders to avoid the use of a thermosetting ingredient and still accomplish dimensional stability and freedom from undue shrinkage.

In this application I am claiming the general aspects of the use of surface-active agents as ingredients of the initial mix, the products produced in this way, and electrical accumulators having distinguishable qualities imparted to them by the use of extremely low resistance separators characteristic of the area C—D of the charts of Figs. 1 and 2.

It may be pointed out that, especially in the leaching treatment to which separators of this class are subjected, some shrinkage is likely to be encountered. This will vary with the nature of the binder and the presence or absence of fully polymerized thermosetting resin; but so long as the shrinkage is both constant and small in extent, compensation may be made for it and accurately dimensioned separators produced.

In a storage battery separator having uniform porosity, the specific resistance to the passage of current by ionic conduction through the separator in an electrical accumulator will vary somewhat with the thickness of the separator. The comparisons made in Fig. 4 are based on separators of substantially the same thickness excepting in the case of wood which for physical reasons must be made somewhat thicker than microporous rubber or the separators of this invention. The separators of this invention appear to be characterized by a new type, uniformity and nature of porosity such that their resistance to the passage of current under electrolytic conditions is exceedingly low. The low resistance is not greatly affected by the thickness of the separators themselves. At the same time the strength of my separators is such as to permit their formation and use in very thin sections. I do not regard thickness as a limitation on the invention, but by way of illustration, in normal practice my separators in the unribbed portions are substantially 0.032 in. in thickness.

Modifications may be made in my invention without departing from the spirit of it. Having thus described my invention in certain exemplary embodiments, what I claim as new and desire to secure by Letters Patent is:

1. In that process of making porous sheet-like articles by admixing with a binder a solvent and a finely divided filler to form a plastic mix, sheeting the mix so formed and removing the filler by procedures involving solution, the step of incorporating into the mix before sheeting a surface-active agent compatible with said binder whereby to effect a lowering of the resistance of the porous body to the passage of electric current through ionic conduction as compared to the resistance of a body identically produced excepting for the incorporation of a surface-active agent into the mix before sheeting.

2. The process claimed in claim 1 wherein the porous body is ultimately dried while retaining a portion of the said surface-active agent.

3. The process claimed in claim 1 wherein the said surface-active agent is a material chosen from a class consisting of sulfated and sulfonated products of mineral, vegetable and animal oils and mixtures thereof.

4. The process claimed in claim 1 wherein the surface-active agent is "sulfonated red oil."

5. The process claimed in claim 1 wherein the surface-active agent is "sulfonated red oil" and in which the said binder includes a thermoplastic resin.

6. The process claimed in claim 1 wherein the surface-active agent is "sulfonated red oil" and in which the relative proportions of binder, surface-active agent and filler are such as to lie within the shaded area of the chart of Figure 1.

7. The process claimed in claim 1 wherein the surface-active agent is "sulfonated red oil" and in which the relative proportions of binder, surface-active agent and filler are such as to lie within the shaded area C—D of Figure 1.

8. A process of making porous articles which comprises commingling from substantially 3% to 44% of a binder, from substantially 42% to 92% of a soluble filler, and from substantially ½% to 30% of a surface-active agent, all percentages being by volume, together with a solvent, homogenizing and plasticizing the mix so formed, sheeting the mix and removing therefrom the soluble filler by leaching.

9. The process claimed in claim 8, in which the said binder is a material chosen from a class consisting of thermoplastic and thermosetting resins and mixtures thereof, in which the surface-active agent is a material chosen from a class consisting of anionic and non-ionic synthetic surface-active agents formed on a base of mineral, vegetable and animal oils, and in which the filler is a water soluble salt inert to the said binder and surface-active agent.

10. A storage battery separator consisting of a body of binder containing in intimate admixture a surface-active agent and having a porosity characteristic of the initial incorporation of a soluble finely divided filler and its subsequent removal, the said separator having a resistance to the flow of current under electrolytic conditions on the 300 ampere discharge test at 0° F. substantially as much lower than the resistance of microporous rubber as the resistance of the latter is lower than the resistance of a wood separator.

11. A porous article formed from an initial mix of binder, soluble filler and surface-active agent together with a solvent for the binder by homogenizing and sheeting such composition and thereafter leaching therefrom the said filler and a portion of the surface-active agent, said porous article having a resistance to the passage of electric current under electrolytic conditions characteristic of the use in the initial mix of proportions of binder, filler and surface-active agent lying within the shaded area of the chart of Figure 1.

12. A storage battery separator formed from an initial mix of binder, soluble filler and surface-active agent together with a solvent for the binder by homogenizing and sheeting such composition and thereafter leaching therefrom the said filler and a portion of the surface-active agent, said separator having a resistance to the passage of electric current under electrolytic conditions characteristic of the use in the initial mix of proportions of binder, filler and surface-active agent lying within the shaded area C—D of the chart of Figure 1.

13. A low resistance separator for electric storage batteries consisting of a resinous body and a residue of surface-active agent in intimate admixture with the resin in said body, said separator having a porosity characteristic of the initial incorporation of a finely divided soluble filler and its subsequent removal, the proportions of the resin, filler and surface-active agent in the initial mix by weight being such as to lie within the shaded area of the chart of Figure 2.

14. A low resistance separator for electric storage batteries consisting of a resinous body and a residue of surface-active agent in intimate admixture with the resin in said body, said separator having a porosity characteristic of the initial incorporation of a finely divided soluble filler and its subsequent removal, the proportions of the resin, filler and surface-active agent in the initial mix by weight being such as to lie within the shaded area C—D of the chart of Figure 2.

15. An electric accumulator of the lead-acid type having positive and negative plates interspaced by separators produced in accordance with claim 1 hereof.

16. An electric accumulator of the lead-acid type having positive and negative plates interspaced by separators produced in accordance with claim 11 hereof.

17. An electric accumulator of the lead-acid type having positive and negative plates interspaced by the separators of claim 14 hereof.

References Cited in the file of this patent

UNITED STATES PATENTS

| Number | Name | Date |
|---|---|---|
| 1,726,223 | Grupe | Aug. 27, 1929 |
| 1,745,825 | Amidon | Feb. 4, 1930 |
| 2,189,889 | Engel | Feb. 13, 1940 |
| 2,306,781 | Francis, Jr. | Dec. 29, 1942 |
| 2,314,203 | Fairclough | Mar. 16, 1943 |
| 2,400,091 | Alfthan | May 14, 1946 |
| 2,531,504 | Dillehay et al. | Nov. 28, 1950 |
| 2,542,527 | Honey | Feb. 20, 1951 |
| 2,564,397 | Duddy | Aug. 14, 1951 |
| 2,591,755 | Wilson et al. | Apr. 8, 1952 |

FOREIGN PATENTS

| Number | Country | Date |
|---|---|---|
| 900,804 | France | July 10, 1945 |